US006905287B2

United States Patent
Doolaege

(10) Patent No.: US 6,905,287 B2
(45) Date of Patent: Jun. 14, 2005

(54) WATER CONTAINMENT STRUCTURE WITH FISH LADDER

(76) Inventor: David Doolaege, P.O. Box 206, Carlotta, CA (US) 95528

(*) Notice: Subject to any disclaimer, the term of this patent is extended or adjusted under 35 U.S.C. 154(b) by 35 days.

(21) Appl. No.: 10/454,060

(22) Filed: Jun. 5, 2003

(65) Prior Publication Data

US 2004/0247395 A1 Dec. 9, 2004

(51) Int. Cl.[7] .............................. E02B 8/08; A01K 61/00
(52) U.S. Cl. ............................. 405/81; 405/82; 119/219
(58) Field of Search ......................... 405/81, 82, 83, 405/103, 104, 107; 256/13; 119/219, 220

(56) References Cited

U.S. PATENT DOCUMENTS

| | | | | |
|---|---|---|---|---|
| 2,625,798 | A | * | 1/1953 | Reed ............................ 405/81 |
| 3,287,918 | A | * | 11/1966 | Stewart ...................... 405/104 |
| 3,323,311 | A | * | 6/1967 | Johnson ....................... 405/46 |
| 3,335,571 | A | * | 8/1967 | Davis .......................... 405/104 |
| 3,373,568 | A | | 3/1968 | Hornbostel |
| 3,861,158 | A | | 1/1975 | Swain |
| 3,894,398 | A | * | 7/1975 | Fritz et al. ..................... 405/36 |
| 4,024,717 | A | * | 5/1977 | Hudson et al. ............. 405/104 |
| 4,352,591 | A | | 10/1982 | Thompson |
| 4,729,691 | A | | 3/1988 | Sample |
| 4,799,821 | A | | 1/1989 | Brodersen |
| 4,966,491 | A | | 10/1990 | Sample |
| 4,981,392 | A | | 1/1991 | Taylor |
| 5,040,919 | A | | 8/1991 | Hendrix |
| 5,059,065 | A | | 10/1991 | Doolaege |
| 5,125,767 | A | | 6/1992 | Dooleage |
| 5,605,416 | A | | 2/1997 | Roach |
| 5,785,455 | A | | 7/1998 | Eaker |
| 5,857,806 | A | | 1/1999 | Melin |
| 5,865,564 | A | | 2/1999 | Miller |
| 5,984,577 | A | | 11/1999 | Strong |
| 6,126,362 | A | | 10/2000 | Carter |
| 6,364,571 | B1 | | 4/2002 | Doolaege |

* cited by examiner

*Primary Examiner*—Jong-Suk (James) Lee
*Assistant Examiner*—Lisa M. Saldano
(74) *Attorney, Agent, or Firm*—M. Reid Russell

(57) ABSTRACT

A fish ladder for incorporation between ends of a water structure that includes at least a pair of separate sleeves that are each formed from a puncture resistant flexible material, contain a volume of water and may have a closed end or ends for resting on edge portions of a flat base plate of the fish ladder. The flat base plate includes a pair of parallel spaced apart upstanding side walls that are individually extend across the flat base plate. The upstanding side walls each include pairs of spaced apart channels extending from the side walls, with the pairs align to receive flat rectangular dam sections fitted therein, forming interior dams that a flow of water, as travels through the fish ladder, fills between as pools that fish, traveling up stream, jump between, to travel up the fish ladder and exit into a body of water that is contained by the water structure.

6 Claims, 5 Drawing Sheets

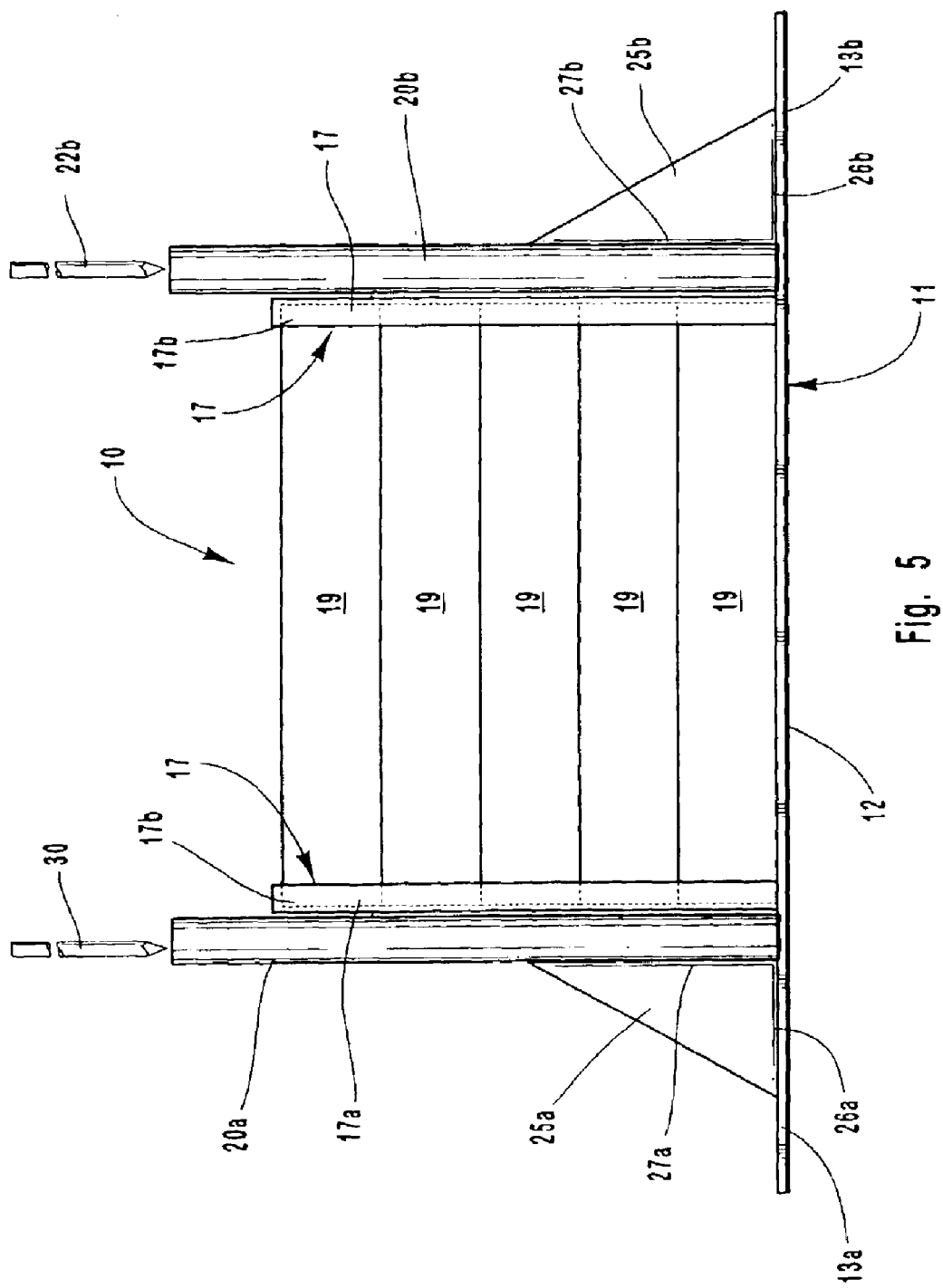

WATER CONTAINMENT STRUCTURE WITH FISH LADDER

BACKGROUND OF THE INVENTION

1. Field of the Invention

This invention relates to structures for damming water courses, controlling and directing water flow, working and support structures where outer fabric sleeves are formed and connected together in side by side relationship, in cascade arrangement, and the like, forming a dam, water course, or the like, and provides for fitting and anchoring a fish ladder type structure at a location across the water course to accommodate upstream migration of fish to their spawning grounds.

2. Prior Art

A need for easily installable and versatile dam structures, and the like, particularly structures that are primarily water or air filled, are relatively inexpensive, non-permanent, reusable and are durable, has been early recognized by the inventor who has been awarded U.S. Pat. Nos. 5,059,065 and 5,125,767 for forming and joining water structures together, forming hydraulic damming structures, and in a recent U.S. Pat. No. 6,364,571, sets out a combination of water transfer and damning structures and platforms. Such water structures have been found to be very useful for safely and reliably containing water and for directing water, and can be useful for controlling hazardous waste, oil or chemical spills, for flood control, and the like. Further, such water structures are also useful, for example, for temporary damming operations such as may be involved in agricultural water storage, construction, for de-watering work sites, fields, or the like, and may even be appropriate for use as permanent or long term structures. These prior art patents of the inventor recognized that fluid filled flexible water control structures and barriers can be used for retention and storage of water, control of water flow and wave action.

A number of configurations of dams and barriers of others have been developed as both semi-permanent and temporary structures. For example, in U.S. Patents to: Hornbostel, Jr., U.S. Pat. No. 3,373,568; Sample, U.S. Pat. No. 4,729,691; Brodersen, U.S. Pat. No. 4,799,821; Hendrix, U.S. Pat. No. 5,040,919; Roach, U.S. Pat. No. 5,605,416; Melin, U.S. Pat. No. 5,857,806; and Miller, et al., U.S. Pat. No. 5,865,564 show various containment, dam and barrier configurations from permanent to portable structures, and include, as shown in the patent to Brodersen, a structure for encircling a chemical or oil spill.

Additionally, applicant has filed a U.S. patent application on a "Water Containment Structure", Ser. No. 10/349,249, dated Jan. 23, 2003, that the water structure for mounting the fish ladder of the invention is suitable for use with. Where this earlier patent application does show various combination of flexible sleeves that are individually joined, as by sewing, into appropriate shapes, and with each inner sleeve to receive a tube or tubes that are filled with water to form a containment structure for a particular area or need, this application, however, does not involve a fish ladder structure and its mounting arrangement as does the invention.

The particular connected sleeves that are formed to hold water or to receive water filled tubes of the invention are unique to the above cited U.S. patent application for a "Water Containment Structure", and their use with a fish ladder like that of the invention is unique. Heretofore, however, other specialty water filled structures have been employed as shown, for example, in Thompson, U.S. Pat. No. 4,352,591; Sample, U.S. Pat. No. 4,966,491; Taylor, U.S. Pat. No. 4,981,392; Eaker, U.S. Pat. No. 5,785,455, and Strong, U.S. Pat. No. 5,984,577. Such systems have generally involved inflatable envelope arrangements and could, within the scope of this disclosure, but have not been utilized with a fish ladder like that of the invention, as shown. Similarly other examples of water structures are shown in patents to Swain, et al., U.S. Pat. No. 3,861,158 and to Carter, et al., U.S. Pat. No. 6,126,362.

BRIEF SUMMARY OF THE INVENTION

It is therefore a principal object of the present invention to provide a fish ladder for installation with a hydraulic structure that is formed from a sections of water filled sleeves, envelopes, or the like, joined together in side by side, end-to-end, or stacked on top of one another, or in other configurations, with the fish ladder arranged for convenient installation between ends of such hydraulic structure prior to filling of the sleeves with water, with the hydraulic structure maintaining the fish ladder in place, resisting a hydraulic force or forces as would tend to permanently move the fish ladder.

Another object of the present invention is to provide a plurality of sleeves that are each formed from a strong puncture resistant material, are joined together, as by sewing, clamping, welding, or like fastening, along common edges with the sleeves to individually contain water or to receive a tube or tubes that, when filled with water, will expand against the sleeve walls, forming water barrier sections, and with two sleeve ends, prior to filling, butted against sides of a fish ladder that is positioned and anchored to a ground surface below a level of water, with the water structure ends to seal against and aid in maintaining the fish ladder in place.

Another object of the present invention is to provide a fish ladder formed from metal sections joined together to provide a flat base plate whereto parallel upstanding walls are secured leaving outer base plate sections as wings to receive sleeve ends, with the upstanding walls reinforced by upright anchor sleeves that can receive poles fitted therethrough to be driven into the ground whereon the fish ladder is to be seated, and include interior aligned channel sections that each receive one or more plates as dam sections slid therein to form a desired wall height within the fish ladder, providing steps with pools therebetween forming a stepped flow of water through the fish ladder that a fish can swim and jump over.

Still another object of the present invention is to provide sleeves that are water tight or are arranged for receiving a tube or tubes fitted longitudinally therein for providing a roll resistant to the sleeve ends that engage opposite sides of the fish ladder.

Still another object of the present invention is to provide a fish ladder that is readily movable to a site for installation between sleeve sections ends to receive dam sections fitted and supported therebetween, forming stepped walls with interior pool therebetween, and the fish ladder is capable of remaining in place for short or long periods of time.

The present invention is in a fish ladder that can be moved as a unit to a job site and is there anchored into the ground between end sections of water structure sleeves. The water structure sleeves are individually formed to be water tight or are arranged to contain and maintain at least one flexible water filled tube in each sleeve. The water structure will resist being rolled when subjected to a side or transverse hydraulic load directed against one face thereof holding the fish ladder between sleeve ends.

The respective sleeves can be formed to have the same or different diameters and lengths, are each preferably formed from a stiff section of material, that will or can be coated to resist punctures, and can be formed into a sleeve or sleeves, as by sewing, utilizing at least one and, preferably, a plurality of seams to stitch the section or sections of material together. Each sleeve can be water tight or can contain at least one, and preferably two, or more, tubes, with the tubes to be filled with water after positioning of sleeve ends against, so as to support, sides of the fish ladder.

The fish ladder of the invention includes a flat base plate having a pair of parallel spaced apart flat walls that are formed from, preferably, steel plates and are mounted to extend at right angles upwardly from across the base plate that is also, preferably, a steel plate. Each wall is spaced an identical distance from a base plate edge, leaving a pair of outer base plate sections or wings that are each to receive a sleeve end positioned thereon. Whereby, with the sleeve filled with water, the water weight is directed into the base plate sections or wings to hold the sides of the fish ladder in place. The parallel spaced apart walls are secured, at equal distances apart, across the flat base plate, extending upwardly at approximately right angles therefrom, and their distance apart is selected to accommodate a fish ladder width. To form with fish ladder, pair of vertical channels are mounted onto the parallel walls opposing surfaces that align as pairs to receive dam sections slid therein, from top to bottom of the parallel walls. The dam sections are preferably wood, as for example, sections of two by sixes, eights, tens or twelves, for example, that are cut to span between the parallel walls with the ends thereof to slide into opposing channels.

For reinforcing the upstanding parallel walls against being displaced apart from a water flow through the fish ladder, vertical pipes are secured onto or through, to extend at right angles upwardly from, the flat base plate, as by welding, and are further secured along their contacting surfaces, to each of the parallel walls outer surfaces. So arranged, the pipes are secured and are at spaced intervals across the flat base, and are in vertical contact with the flat walls outer surfaces, with the flat walls opposing inner surfaces having the described channel sections secured thereto that are to receive the dam sections.

In practice, the dam section are fitted as an edge to edge stack into the aligned channels, forming a dam section a desired height from the flat base plate, extending upwardly to as high as the top the parallel walls. The dam sections form water containing compartments therebetween that step from a greatest height proximate to the level of water as is held back by the water structure, to approximately the level of the water flow that is passed out from the fish ladder. Which dam compartments, when water is directed through the fish ladder, each to provide a fish holding pond that a fish jumps into and from to proceed up the fish ladder and into a body of water as is held back by the water structure.

The weight of the body of water pressing upon the flat base plate between the parallel walls, and the weight of the water structure sleeve ends resting upon the wing portions of the flat base plate outboard from the parallel walls, will generally be sufficient to maintain the fish ladder in place. However, should additional anchoring be required, then the pole ends as are secured onto the flat base plate can be drilled with rods or pipes fitted through the poles and flat base plate and are driven into the ground below the fish ladder, further anchoring the fish ladder in place.

DESCRIPTION OF THE DRAWINGS

In the drawings which illustrate that which is presently regarded as the best mode for carrying out the invention:

FIG. 5 is a front elevation view of the fish ladder of FIG. 4, that is shown as including right angle gusset plates secured, respectively, along their vertical legs to an outer surface of vertical pipes, and having the gusset plates lower legs secured to the flat base plate, with the gusset plates for reinforcing the mounting of the vertical pipes and parallel vertical walls onto the flat base plate.

DETAILED DESCRIPTION OF THE INVENTION

Heretofore, water structures as have been formed on site as a dam, or the like, have generally included sleeves or tubes that are positioned on the ground and filled with water. Such have generally been formed from plastic and where such have been used they have been found to be fragile and subject to puncture and tearing in the physical setting where they are laid out, such as over rocks, tree branches, or the like. Such fragility has been addressed in a patent application of the present inventor, Ser. No. 10/349,249 entitled "Water Containment Structure" that is cited in the present application Prior Art Section, and is a preferred structure for incorporation with the invention as set out herein.

Figure 2:
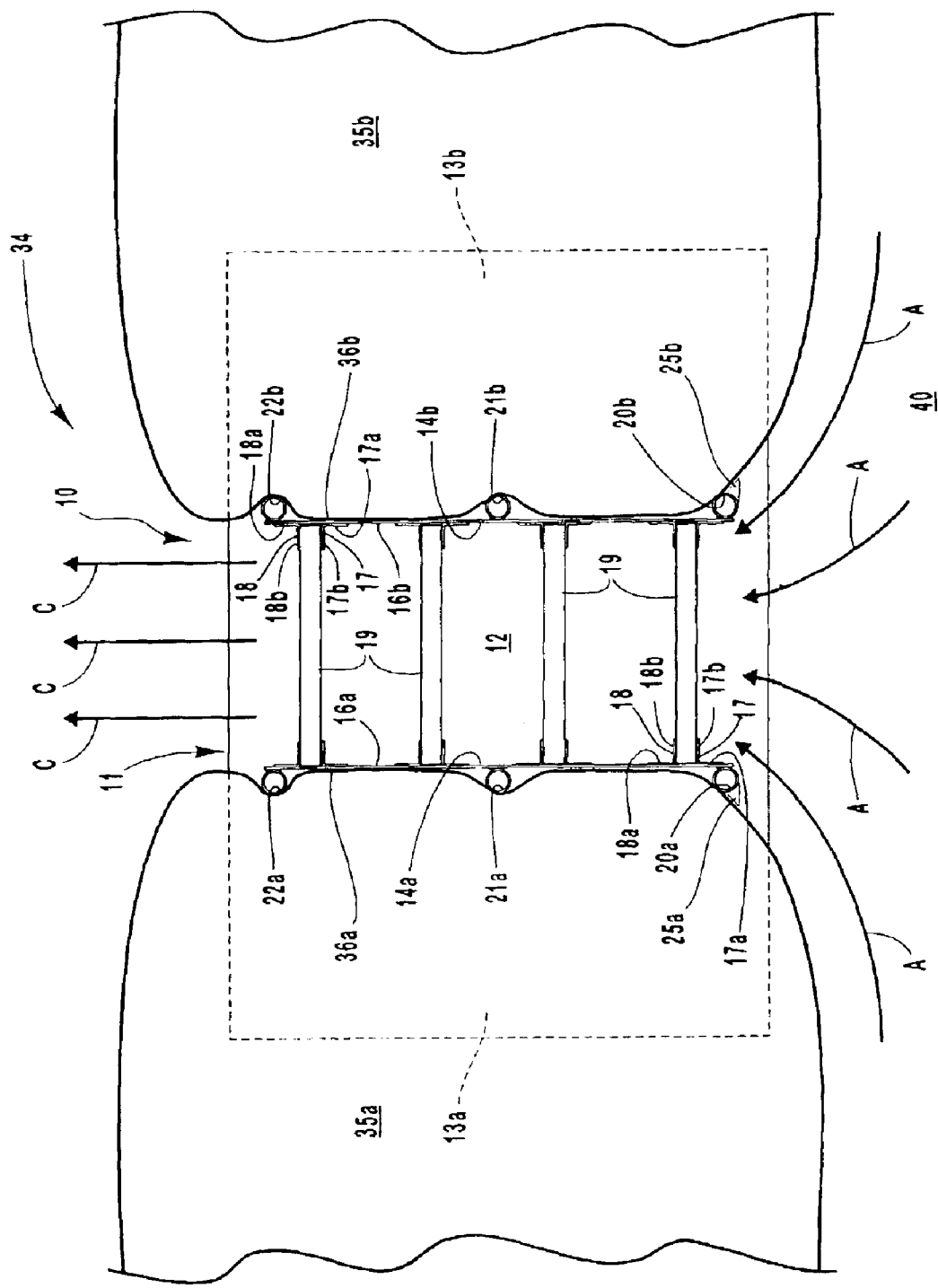
FIG. 2 is a top plan view of the fish ladder of FIG. 1, that is shown maintained at the fish ladder base plate outer sections or wings, shown in broken lines, between ends of a water structure, and showing, with arrows A, B and C, a water flow through the fish ladder from a body of water held back by the water structure, the flow traveling from rear to front of the fish ladder.
Figure 4:
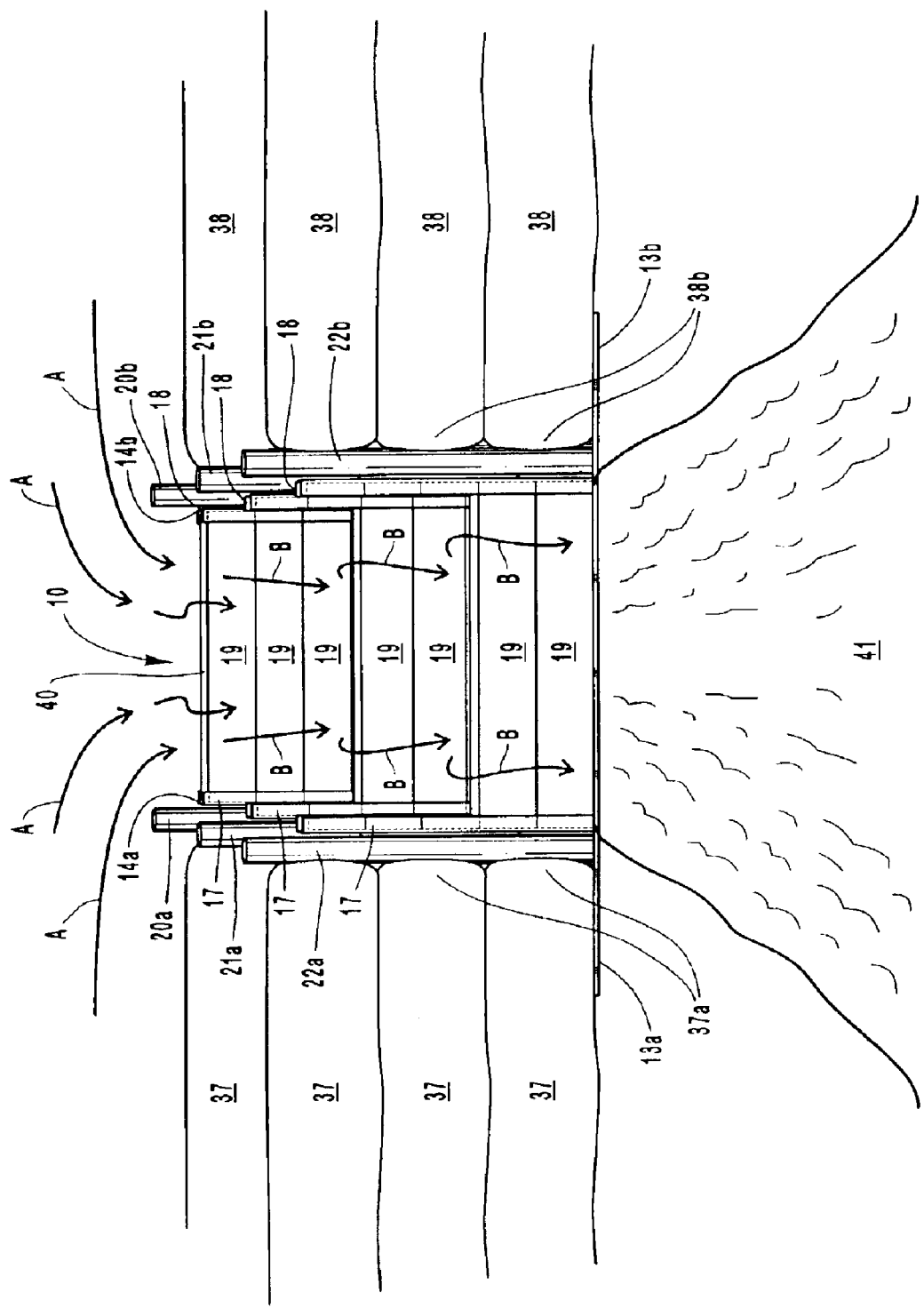
FIG. 4 is a view like that of FIG. 3 taken from the front and slightly above the fish ladder and water structure ends and showing, with arrows A and B, a water flow directed into the fish ladder, that travels across the dam sections, filling the areas between which dam sections, and then passes into a stream.

The present invention is in a unique fish ladder for incorporation with a water containment structure that includes unique sleeves 35a, 35b, 37 and 38, as shown in FIGS. 2 and 4, respectively, that can be a pair or more of sleeves that are maintained in side by side, or stacked relationship, or contained in an outer sleeve. Each such sleeve can itself contain water, or each sleeve can be arranged for containing a water filled tube or tubes, with such sleeve or tube, the closed at its end or ends, forming a water structure, such as a dam.

Figure 3:
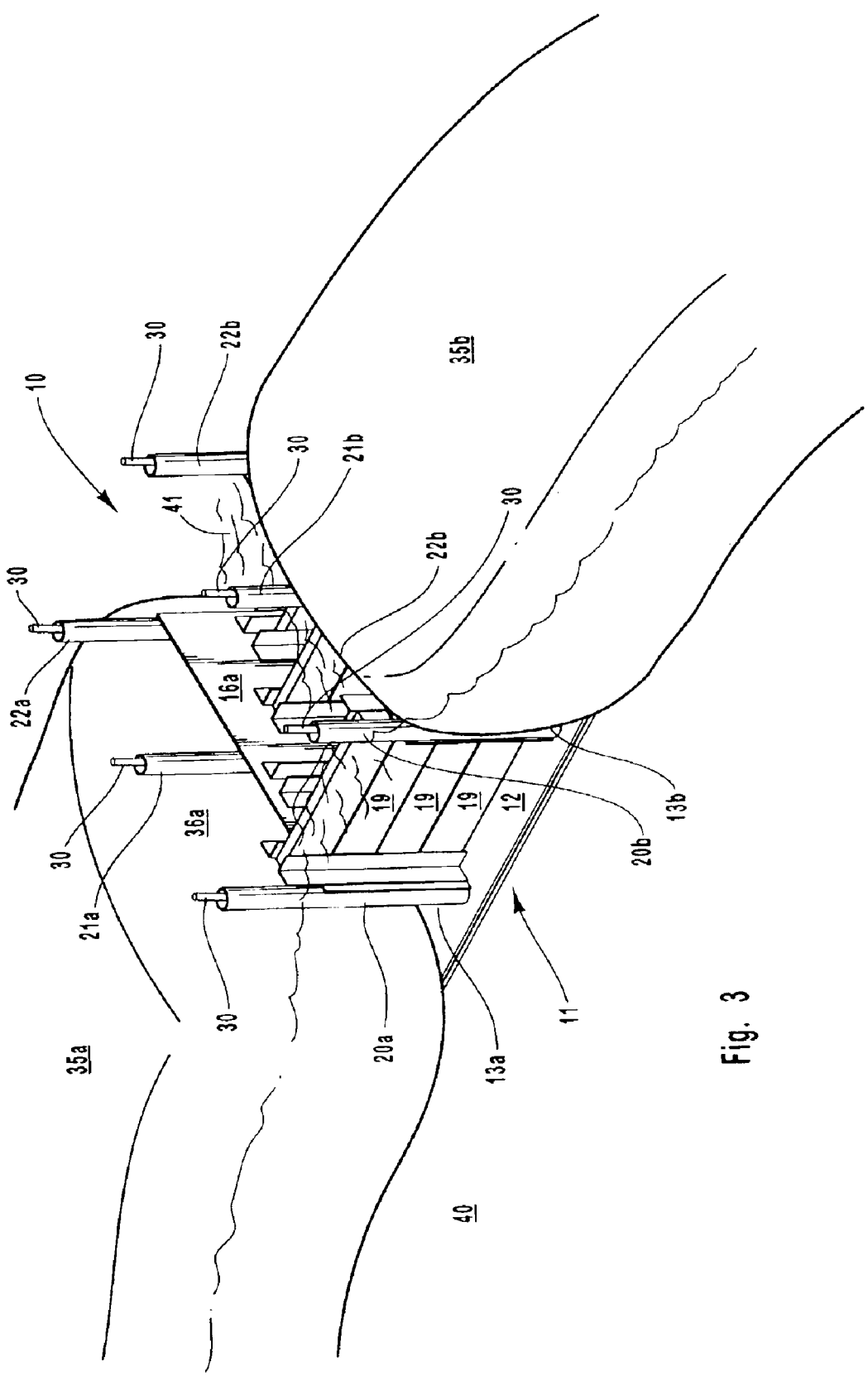
FIG. 3 shows a perspective view taken from above the rear and right side of the rear of the fish ladder and water structure of FIG. 2, and including additional fish ladder anchoring is provided by poles that are fitted through side support pipes and are driven into the ground below the fish ladder.

The invention in a fish ladder 10 is for positioning between aligned sleeve 35a and 35b ends 36a of a water structure like that shown in FIG. 3. The sleeves, for use with the fish ladder, are preferably constructed by a sewing together sections of a strong, flexible material, forming a cylindrical shape that is puncture and tear resistant. The preferred sleeve material can be a section of thick plastic material, such as a polyethylene, but is preferably a section of a mesh material that is a weave of stripes of a plastic, or like material, having a strong or high tensile strength that is tear resistant. A material know as woven polypropylene geotextile has been used in practice for forming the sleeves for use with the invention. The sleeve or sleeves can be sewn with a Kevlar thread or the like, forming seams, that can be reinforced as with sections of belting, such as automobile seat belt material, that is sewn onto the sleeve surfaces at the seam, and individual sleeves 37 and 38 can be maintained together as by sewing them together along contacting surfaces, as shown in FIG. 4, with the sleeves ends maintained over flat base plate outer wing sections 13a and 13b of the fish ladder 10.

Figure 1:
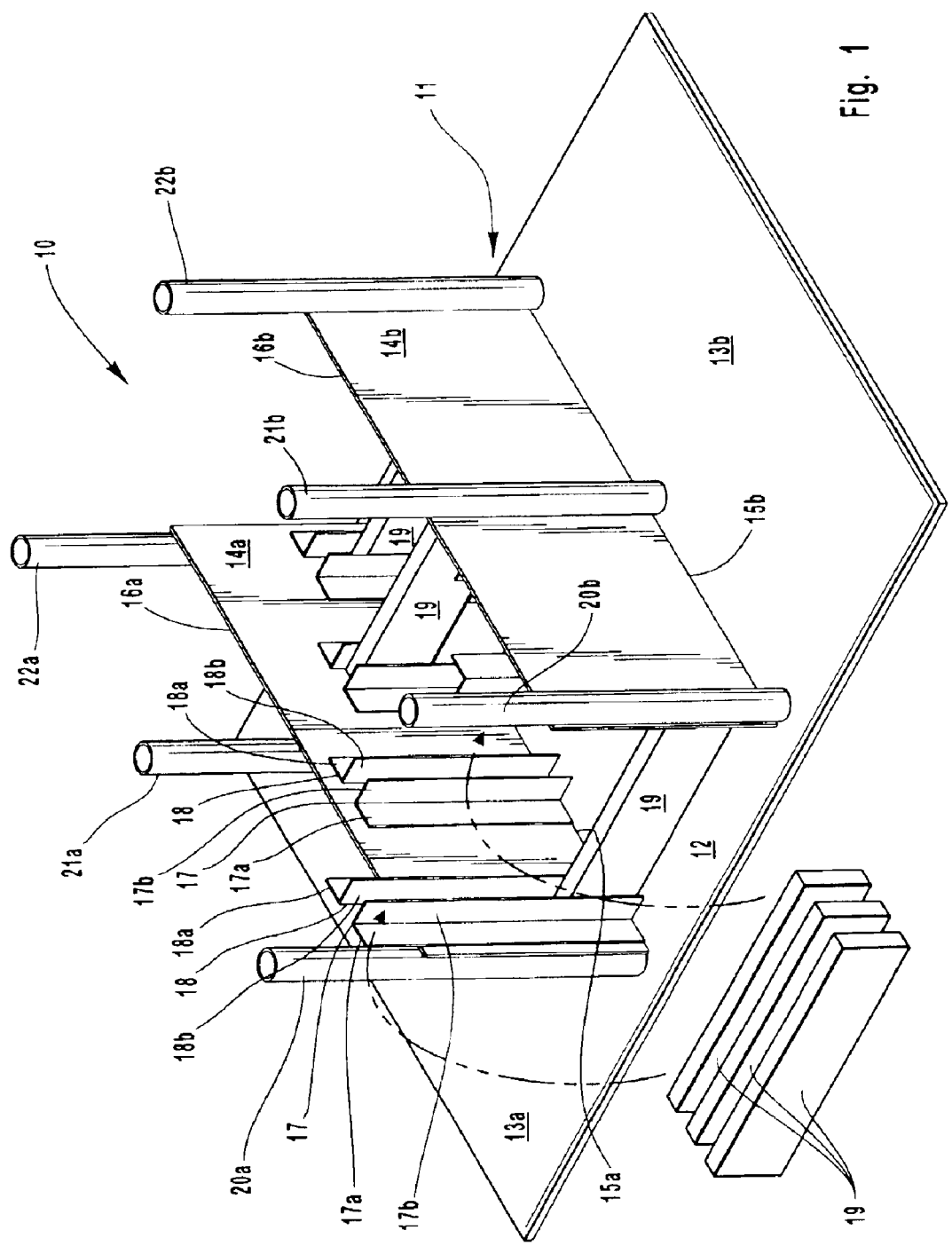
FIG. 1 is a rear and side elevation perspective view looking down from the top of a fish ladder of the invention, showing, in broken lines, how dam sections are fitted, one by one, into opposing channels to form a barrier across a water flow path through the fish ladder.

The fish ladder 10, shown in FIG. 1, includes a flat base plate 11 having a center section 12 and the outer wing sections 13a and 13b that are formed by the junctions with the flat base plate of lower edges 15a and 15b of right angle parallel walls 14a and 14b. Which junctions 15a and 15b are preferably formed by welding the parallel walls 14a and 14b lower edges onto the top surface of the flat base plate 11, with the center section 12 of the flat base plate 11 therebetween and with the outer wing sections 13a and 13b aligning in the same plane and extending at right angles outwardly from which junctions 15a and 15b. Shown in FIGS. 1 and 2, the opposing inner surfaces 16a and 16b of the parallel walls 14a and 14b include right angle sections 17 and 18 that, as shown best in FIG. 1, are individually mounted, as by welding, along their respective base legs 17a and 17a to the respective parallel inner surfaces 16a and 16b. In which mounting the right angle sections legs 17b and 18b are parallel, are spaced apart a selected distance, that is the width of dam sections 19, and extend parallel to one another to function as channels for receiving ends of flat dam sections 19, as shown in the FIGS. The dam sections 19 are preferably sections of wood that are individually slid into which channels, from top to bottom, contacting each other edge to edge, forming a stack of dam sections 19 that function as a dam wall. The dam wall will hold back or contain water passed from the body of water that is held back by the water structure.

To provide strength to the parallel walls 14a and 14b, so as to prohibit them from being forced apart by a flow of water through the fish ladder, the invention preferably includes spaced vertical pipes 20a and 20b, 21a and 21b and 22a and 22b, that are each fixed, at their lower ends, to the flat base plate 12, forming a junction with the wings 13a and 13b. Further, as set out below, the individual vertical pipes may each open through a hole in the flat base plate 11, below each vertical pipe, to pass posts, as shown in FIGS. 3 and 5, therethrough that are then driven into the ground below the fish ladder, for anchoring it to the ground. The vertical pipes 20a and 20a, 21a and 21b and 22a and 22b, are each secured, preferably by welding, along the individual pipe contacting surfaces with the respective parallel walls 14a and 14b, providing for bracing and maintaining the walls in a right angle attitude to which flat base plate 11 top surface. Additionally, further bracing can be provided, as shown in FIG. 5, by a mounting of gusset plates 25a and 25b across the junctions of the pipes 20a and 20b. The gusset plates 25a and 25b are shown as flat right triangle sections that each have their base legs 26a and 26b secured, as by welding, to the flat base plate 11 top surface, and have their vertical legs 27a and 27b each connected, also preferably by welding, along contacting surfaces with the pipes 20a and 20b. So arranged, the pipes 20a and 20b, 21a and 21b and 22a and 22b support and brace the parallel walls 14a and 14b against their being pivoted apart from a force of a water flow passing therebetween. While only the pair of gusset plates 25a and 25b are shown in FIG. 5 as bracing the pipes 20a and 20b that are immediately adjacent to the body of water that is held back by the water structure. It should, however, be understood, that gusset plates 25a and 25b, or the like, can be included with each of the other vertical pipes 21a and 21b, and 22a and 22b, as shown in FIG. 3, within the scope of this disclosure. Additionally, in practice, a utilization of the gusset plates 25a and 25b, with the fish ladder 10 of FIG. 2, will provide for bracing to hold in place the rear ends 36a and 36b of the water filled water structure sleeves 35a and 35b, tending to anchor the fish ladder 10 against it being displaced by a water flow through the fish ladder, shown as arrows B.

For further anchoring of the fish ladder 10 in a stream bed, the invention may include poles 30, with pole ends and pole segments shown in FIGS. 3 and 5, and are, shown in FIG. 5 aligned for fitting into, to travel the length of the pipes 20a and 20b and be driven into the ground. The poles top ends, as shown in FIG. 3, extend out from the top ends of pipes 20a and 20b, and include pipes 21a and 21b and 22a and 22b. In practice, as shown in FIG. 2, the body of water 40 is held back by a water structure that includes the sleeves 35a and 35b and incorporates the fish ladder 10. With a weight of water in the sleeves 35a and 35b that is directed through the sleeve ends 36a and 36b that, along with the weight of the fish ladder itself, may be sufficient to maintain the fish ladder, as shown. So arranged, as shown in FIG. 2, a volume of water, shown as arrows A, flows from the body of water 40, through and across the tops of the stack or single dam sections 19, exiting into a stream, shown as arrows C. With arrows B in FIG. 4, illustrating the flow that travels through the fish ladder 10, across the dam sections 19, and filling the areas between which stacks of dam sections 19. Where, however, the combined weights of water in the sleeves 35a and 35a and fish ladder 10 are not sufficient to maintain the fish ladder 10 in place against the hydraulic forces from the body of water 40, pairs of the pipes 20a and 20b, 21a and 21b and 22a and 22b can each receive, as shown in FIG. 2, the poles 30 fitted therethrough, that travel through the flat base plate 11 and are driven into the ground.

Similar to the arrangement of the sleeves 35a and 35b ends 36a and 36b that are maintained on the flat base plate wings 13a and 13b of fish ladder 10, as shown in FIG. 2. FIG. 4 shows the plurality of water filled sleeves 37 and 38 respectively, that are arranged on top of the opposite sides of the fish ladder 10, resting on the flat base plate wings 13a and 13b. So arranged, the weight of water at the sleeve ends 37a and 38a is directed into the fish ladder flat base plate 11 wings 13a and 13b, against the pipes 20a and 20b, 21a and 21b and 22a and 22b and parallel walls 14a and 14b, maintaining the fish ladder 10 in place.

In practice, the fish ladder can be utilized with a water structure, as shown, that includes sleeves 35a and 35b, each containing water filled tubes, as shown in FIGS. 2 and 3. Or a water structure that includes the plurality of sleeves 37 and 38, that either individually contain water or that each contain at least one water filled tube can be used as the water structure. In either arrangement, the water structure has its respective ends 36a and 36b and 37a and 38a positioned on top of wings 13a and 13b of the fish ladder 10 flat base plate 11. The water structure ends are held by their weight of water therein directed against the fish ladder, sealing against the outer surfaces of the parallel walls 14a and 14b and may include curtains, or the like, not shown, fitted against the fish ladder walls, not shown, for improving the seal. So arranged, the fish ladder parallel walls 14a and 14b inner surfaces 16a and 16b direct a flow of water from a body of water 40, shown as arrows A in FIG. 2 and 4, therethrough. With that flow, shown as arrows B in FIG. 4, to pass from the fish ladder 10 into stream 41, shown as arrows C in FIG. 3.

In setting up the fish ladder 10, dam sections 19 are individually slid into to travel along the channels formed between the right angle sections 17a and 18a legs 17b and 18b, forming dam type barriers against a flow, arrow B of FIG. 4, that passes through the fish ladder 10. For the channels next to the pipes 20a and 20b, or first channels, that are adjacent to the body of water 40, the number of dam sections 19, as are fitted one by one into the vertical channels are selected to provide a barrier whose top edge is just below the level of the body of water 40, to provide a spill way thereacross. The number of dam sections 19 as are fitted one by one into the subsequent channels are spaced from the first channel, and from one another, are of a height that is selected to function as steps, down from the stream 41. So arranged, a flow of water, shown as arrows B in FIG. 4, fills the spaces between the opposing dam sections 19 as that water flows through the water ladder 10, forming pools. A fish swimming up stream from the stream 41 jumps up and over the stacks of dam sections, and into the pools therebetween until it is able to jump the last stack of dam sections 19 and into the body of water 40, completing its transit through the fish ladder 10.

Although a preferred embodiment of the invention in a fish ladder has been shown and described herein, it should be understood that the present disclosure is made by way of example only and that variations are possible, within the scope of this disclosure, without departing from the subject matter coming within the scope of the following claims and reasonable equivalency thereof, which claims I regard as my invention.

I claim:

1. A fish ladder incorporated with a water structure comprising, a flat base plate; spaced upstanding parallel side walls that are individually secured along each of their lower edges to extend upwardly from and substantially across a top surface of said flat base plate and are equidistant from and substantially parallel to outer edges of said flat base plate, forming like sized flat base plate wing sections; pairs of channel means that are each individually secured to one of said upstanding side walls opposing surfaces for receiving dam sections fitted therein, and with the individual channel means in each pair aligning with one another to receive one or more of said dam sections; a plurality of dam sections each formed as flat rectangular member of like height, width and thickness and whose ends are to fit into, to pass along, opposing channels; means for maintaining the flat base plate in position between ends of a water structure that consists of at least a pair of sleeves with each sleeve including means for maintaining water therein, with each said sleeve having a closed end for positioning onto one of said like sized flat base plate, wing sections with each said sleeve end resting against an outer surface of an adjacent upstanding parallel side wall and each said sleeve end positioned on one of said like sized flat base plate wing sections.

2. The fish ladder incorporated with a water structure as recited in claim 1, further including means for maintaining the upstanding parallel side walls at approximately right angles to the flat base plate top surface.

3. The fish ladder incorporated with a water structure as recited in claim 2, wherein the means for maintaining the upstanding parallel side walls are straight pipes that are spaced apart from one another and are secured, at their bottom ends, onto the flat base plate top surface and to said upstanding parallel side walls along common surfaces.

4. The fish ladder incorporated with a water structure as recited in claim 3, wherein the flat base plate includes holes formed therethrough that open into bottom ends of one or more of the pairs of straight pipes; and including poles for fitting through top ends of a pair or pairs of said straight pipes and are driven into the ground beneath the flat base, anchoring said fish ladder.

5. The fish ladder incorporated with a water structure as recited in claim 1, wherein the channel means are each a pair of right angle members that each have a flat base and an outstanding side formed at right angles to one another, and said flat base side is connected onto an inner surface of an upstanding parallel side wall whereby outstanding sides of each of said pair of right angle members are positioned alongside and spaced appropriately apart to accommodate the dam sections fitted therebetween, are parallel to one another and extend outwardly from said parallel side wall inner surface.

6. The fish ladder incorporated with a water structure as recited in claim 1, wherein the pair of sleeves each include a water containing tube means; and the sleeve ends adjacent to the fish ladder are closed and each includes means for maintaining said sleeve ends on said flat base plate edges, and against the upstanding parallel side walls.

* * * * *